United States Patent [19]

Philips

[11] Patent Number: 4,814,603
[45] Date of Patent: Mar. 21, 1989

[54] METHOD AND APPARATUS FOR DETERMINING THE SIZE OF DEFECTS IN ROLLING ELEMENT BEARINGS WITH HIGH FREQUENCY CAPABILITY

[76] Inventor: Gerald J. Philips, 1168 St. George dr., Annapolis, Md. 21401

[21] Appl. No.: 11,603

[22] Filed: Feb. 6, 1987

Related U.S. Application Data

[63] Continuation-in-part of Ser. No. 748,084, Jun. 24, 1985, and a continuation-in-part of Ser. No. 886,827, Jul. 18, 1986.

[51] Int. Cl.$^4$ ................................................. H01J 5/16
[52] U.S. Cl. ................................. 250/227; 250/231 R; 73/655
[58] Field of Search ...................... 73/653, 655, 593; 250/231 R, 227; 356/373, 375

[56] References Cited

U.S. PATENT DOCUMENTS

| | | |
|---|---|---|
| 3,273,447 | 9/1966 | Frank . |
| 3,327,584 | 6/1967 | Kissinger . |
| 4,171,645 | 10/1979 | Miserentino et al. ................. 73/655 |
| 4,196,629 | 4/1980 | Philips . |
| 4,325,259 | 4/1982 | Willertz ............................... 73/653 |
| 4,379,226 | 4/1983 | Sichling et al. . |
| 4,591,711 | 5/1986 | Thalmann . |
| 4,649,271 | 3/1987 | Hök et al. ........................ 250/227 T |

OTHER PUBLICATIONS

Japanese Abstract, vol. 9, No. 72 (P-345) (1795) Apr. 2, 1985, Displacement Detector.
Japanese Abstract, vol. 6, No. 148 (P-133) (1026) Aug. 7, 1982, Measuring apparatus for vibration.
Japanese Abstract, vol. 8, No. 117 (P-277) (1554) May 31, 1984, Displacement Detecting Device of Rotating Object by Optical Fiber.

*Primary Examiner*—David C. Nelms
*Attorney, Agent, or Firm*—Foley & Lardner, Schwartz, Jeffery, Schwaab, Mack, Blumenthal & Evans

[57] ABSTRACT

A method and apparatus for determining the length of bearing defects along the direction of rolling, including also a transducer system with high frequency (10,000 Hz) capability for detecting and measuring the displacement and/or vibration of objects placed in contact therewith. The system includes a reflective cantilever spring which serves as the target for reflecting incident light and vibrating in unison with a contacted object. Fiber optics guide light from a light source to the target and back to a signal generator. A crowned cylindrical ruby tip provides the object contacting surface and is biased by the cantilever spring. The light guiding fiber optics and cantilever are sealed from the hostile environment of the transducer.

30 Claims, 10 Drawing Sheets

METHOD AND APPARATUS FOR DETERMINING THE SIZE OF DEFECTS IN ROLLING ELEMENT BEARINGS WITH HIGH FREQUENCY CAPABILITY

CROSS-REFERENCE

This is a continuation in part of application Ser. Nos. 748,084, filed June 24, 1985 and 886,827, filed July 18, 1986.

BACKGROUND OF THE INVENTION

1. Field of the Invention

The invention relates to motion transducers, and more particularly to transducers for measuring displacement and very small amplitude high frequency vibrations in hostile environmental conditions such as grease, oil, metallic sludge, corrosion, high ambient vibration, high temperature, electrical, and electromagnetic interference.

2. Related Art

Fiber optic devices for the detection and measurement of displacement and vibration have been disclosed by U.S. Pat. No. 3,273,447 to Frank and by U.S. Pat. No. 3,327,584 to Kissinger. Those devices have the capability to provide diplacement measurements over a wide frequency range, including the range 0–10,000 Hz. However, the output of those devices attributable to Kissinger, which have been commercially marketed, are proportional to target surface motion as well as target surface reflectivity. To sense and measure motion precisely with these devices it is necessary to ensure that the target surface reflectivity is constant while meaurements are being taken.

It has been found that accurate dynamic measurements can not be made with unencapsulated fiber optic devices in environments where there is contamination of the target surface or of the optical path to the target surface. Other non-contact motion transducers, such as eddy current or capacitive types can also provie high frequency displacement measurements, but they too suffer a degradation of performance when used in an environment that causes a metallic-based or any other electrically conductive contaminant to collect at the sensing tip. For example, when using any non-contacting devices to monitor bearing vibration in the manner disclosed in U.S. Pat. No. 4,196,629 to Philips (which is hereby incorporated by reference), it was found that bearings corrode in their housings and that the bearing lubricant can migrate into the sensing area, mixing with the corrosion debris as it migrates. The mixing of corrosion products and lubricant creates a metallic-based sludge that degrades the performance of any transducer that is sensitive to metallic substances or is dependent upon a clear optical path to the target.

Contact probes generally overcome fouling problems however these devices have a very limited frequency capability. Dial indicators and linear variable differential transformers are two examples of contact sensors that provide accurate position measurements but can not be used to measure vibrations in the displacement domain up to 10,000 hertz.

Miserentino et al., U.S. Pat. No. 4,171,645, disclosed displacement probes that combined non-contact fiber optic transducers with self-contained contact targets. Miserentino does not provide for high frequency measurement capability in any of his several embodiments. In fact, it is obvious from his embodiments that only low frequency vibration or simple position measurements are possible from his teachings.

Sichling et al., U.S. Pat. No. 4,379,226, disclosed an optical sensing device which contains a vibrating spring whose frequency of vibration is determined by the parameter p to be measured. Sichling does not specify how fast the parameter p may vary and it is obvious from the embodiments given that high frequency measurements are not possible with his teachings.

Thalman in U.S. Pat. No. 4,591,712 disclosed a sensing apparatus wherein a reciprocal plunger is utilized to alter the amount of light reflected back into an enclosed bundle of fiber optic elements. Thalman does not provide for high frequency capability in his device and it is obvious that his device could not be used for high frequency vibration measurements.

An encapsulated motion transducer has been disclosed in copending application Ser. No. 886,827, filed July 18, 1986, and is designed to operate in hostile environments with a high frequency capability.

Figure 1:
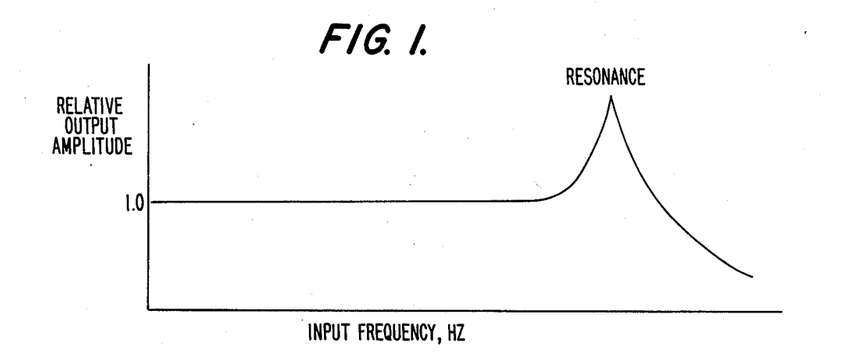
FIG. 1 is a typical response curve of a spring-mass system.

The embodiments submitted in the copending application can be used to measure displacement of vibrating objects but there are problems and limitations with those embodiments. The high frequency response of any spring-mass system is limited by the first resonant mode of vibration of the system. A typical response curve for a spring-mass system is shown in FIG. 1. A successful sensor design is one that operates in the flat region below the resonant peak and where the resonant peak is above 10,000 Hz.

The resonant frequency is proportional to the stiffness of the spring and inversely proportional to the mass of the moving elements. Therefor, in the design of a spring-mass system to obtain the highest possible resonant frequency, the designer should strive to achieve the largest spring stiffness and the smallest mass. In the copending application, the mass of the sapphire tip can not be optimized to extremely small values because the design requires a ball diameter larger than the diameter of the springs. The spring elements are likewise forced to larger than optimum values because the fiber optic elements must pass through the springs in the embodiments shown. The stiffness of the spring elements can not be set at values that are high enough to compensate for the large masses of the embodiments given. High spring stiffnesses cause high contact pressures between the tip and the object surface which can result in contact deformations, permanent denting and other problems. In fabricating and testing embodiments shown in the copending application, the highest resonant frequency that was practically obtainable was approximately 700 Hz. Other problems such as friction among the spring elements and between the tip and casing were found to degrade the performance of devices of the copending application by reducing the actual resonant frequency below the value calculated where frictional effects are not considered.

In the device disclosed by U.S. Pat. No. 4,196,629 to Philips vibration measurements are made up to 10,000 Hz. Thus, there is a continuing need in the state-of-the-art for a contact displacement transducer with high frequency capability to 10,000 Hz.

In U.S. Pat. No. 4,196,629 the outer race of a ball bearing is deflected outward radially in the vicinity surrounding each of the balls, and a fiber optic proximity probe can be used to detect those deflections. Three types of waveforms are disclosed which result from defects on the outer ring, inner ring, or ball. Also explained is the peak to RMS ratio of the waveforms which could be used as an indicator of impending bearing failures.

Experience with bearing failures in rotating machines indicates that defects on bearing component parts often grow to be of quite significant size prior to the initiation of catastrophic failure. For example, cracks or spalls initiated on bearing inner or outer rigs have been found to have grown to the point where they cover the entire circumference of the ring. There is therefore, a continuing need in the state of the art of bearing vibration monitoring to be able to determine the size of bearing defects.

SUMMARY OF THE INVENTION

The invention provides a method for determining the length of bearing defects along the director of rolling and a contact transducer for making vibration measurements in the displacement domain with a high frequency capability to 10,000 Hz. The transducer sensing means is a non-contact fiber optic bundle whose light throughput is modulated by motion of a cantilever beam. A ruby contact tip is bonded to the beam. In operation, the ruby tip is biased against a vibrating object by forces from the cantilever beam which has been initially deflected a predetermined amount. Sealing means are provided to protect the sensing means from contamination and fouling.

It is a primary objective of this invention to provide a contact displacement transducer with a flat frequency response from zero to 10,000 Hz.

Another purpose of this invention is to provide an encapsulated fiber optic contact transducer with a flat frequency response capability from zero to 10,000 Hz.

Another important purpose of this invention to provide a high frequency motion transducer that is not affected by physical environment or atmospheric problems such as contamination of the sensing path by gaseous, liquid or solid substances.

Yet another purpose of this invention is to provide an encapsulated motion transducer having a flat frequency response from DC to any higher frequency desired which response can be calculated and controlled by design.

A transducer system detects and measures the displacement and/or vibration of objects placed in contact therewith. The system includes a reflective target for reflecting incident light and vibrating in unison with a contacted object. Fiber optics guide light from a light source to the target and back to a light sensing means. A cylindrical ruby tip is adhesively bonded to a cantilever spring. The ruby tip is crowned to accommodate misalignment and to minimize contact stresses. The ruby tip is biased against an object surface by the cantilever spring. The cantilever spring also provides a reflective target for the fiber optic elements. The light guiding fiber optics and cantilever spring are sealed from the hostile environment of the transducer.

BRIEF DESCRIPTION OF THE DRAWINGS

A more complete appreciation of the invention and many of the attendant features thereof will be readily appreciated as the same becomes better understood by reference to the following detailed description when considered in connection with the accompanying drawings wherein:

FIGS. 8a-13a illustrate the display of the damaged bearing of FIGS. 8-13.

DESCRIPTION OF THE PREFERRED EMBODIMENTS

Referring now to the drawings, like reference characters designate identical or corresponding parts throughout the several views.

As stated above FIG. 1 illustrates a typical response curve for a spring-mass system.

Figures 2, 3:
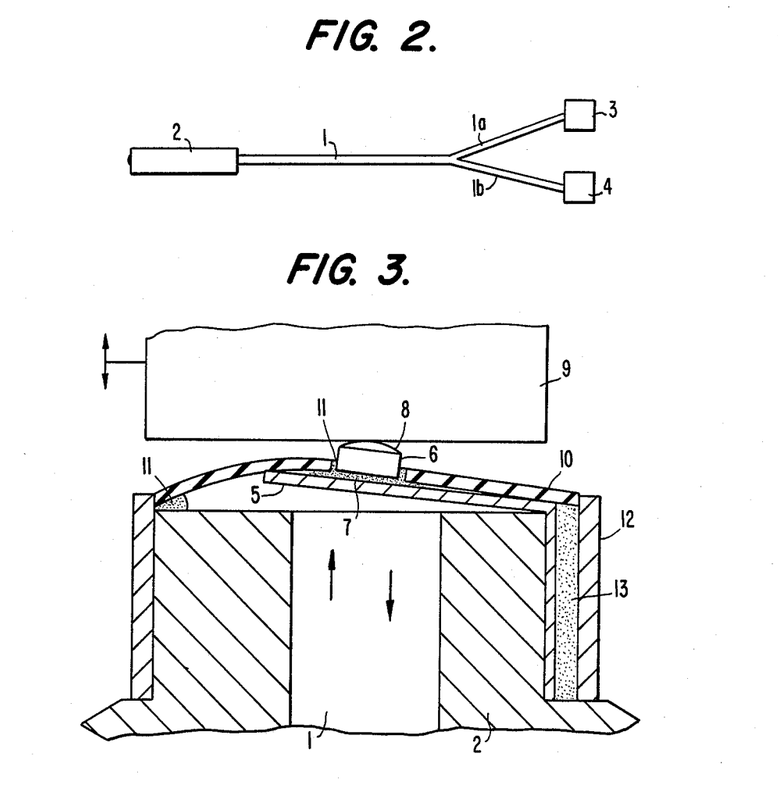
FIG. 2 is a schematic of a first embodiment of the invention.
FIG. 3 shows the target end of the invention in cross-section.

Referring to FIG. 2, numeral 1 designates a plurality of fiber optic light guides which pass into a housing 2 at one end and which are bifurcated at the opposite end into two groups 1a and 1b where a light source 3 and a light detector 4 are provided. The light source 3 provides continuous illumination of either visible or invisible light to the fiber optic light guides 1a. The detector 4 is sensitive to the intensity of light that is returned through the fiber optic light guides 1b.

Referring to FIG. 3 which shows the sensing end of the invention in cross-section, the fiber optic light guides 1 are shown encased in a rigid housing 2. A stainless steel cantilever spring 5 protrudes over the fiber optic elements at a slight angle which is set so that light reflected into the light guides 1 is at its maximum value. The underside of the cantilever provides a reflective target for the fiber optic elements and therefore should be large enough to cover the spot of light subtended by the fiber optic bundle. The cantilever is electropolished to maximize reflectivity. In operation, the sensor is brought into contact with the object such that the cantilever 5 is deflected toward the fiber bundle 1. The amount of initial deflection should be greater than any operational deflection expected to be encountered. A ruby tip 6 is bonded to the cantilever using adhesives 7 suitable for the temperature operating range expected. The adhesives should also be unaffected by any oils or greases or other substances which may come into contact with the sensor. The preferred embodiment uses an activator cured adhesive which has a urethane methacrylate ester base. Structural epoxy adhesives are also available which will work quite well. The ruby tip 6 has a crown radius which should be as large as possible to minimize contact stresses between the ruby tip 6 and a vibrating object 9. The radius should not be so large however that misalinement between tip and object surfaces would cause edge loading of the ruby tip. In the preferred embodiment, the diameter of the ruby tip is one millimeter and the crown radius is 2.5 mm. In the preferred embodiment, misalignments up to 5 degrees can be tolerated. A flexible seal 10 is made of silicone rubber and is adhesively bonded to the cantilever 5, the fiber bundle housing 2, and the ruby tip 6 using an adhesive 11 that is suitable for the operating temperature range to be encountered. This adhesive should also be unaffected by any oils or greases or other substances that may come into contact with the sealing means. A silicone RTV adhesive is used in the preferred embodiment. An outer ring 12 is provided to enclose the sealing means and to provide support to the cantilever element. The outer ring 12 is bonded in place with adhesives 13 that are suitable for the temperature range to be encountered. Structural epoxy adhesives are adequate for this purpose.

In the design of the transducer, the masses of all the moving elements; the ruby tip 6, the spring 5, the ahesives 7 and 11, and the flexible seal 10 should be considered and kept as small as possible. In the preferred embodiment, the total of the masses of the moving elements should not exceed 0.00004 lbs. The spring rate of the cantilever spring 5 should be selected to be large enough to result in a resonant frequency above 10,000 Hz. In the preferred embodiment, the spring rate should be at least 200 lb/in. The maximum deflection of the cantilever spring 5 and the resultant contact force between the tip 6 and object 9 should be limited to values that give safe contact pressures at the tip/object interface. In the preferred embodiment, maximum cantilever deflection is 0.008 inch and the maximum contact pressure is 250,000 psi.

Figure 4:
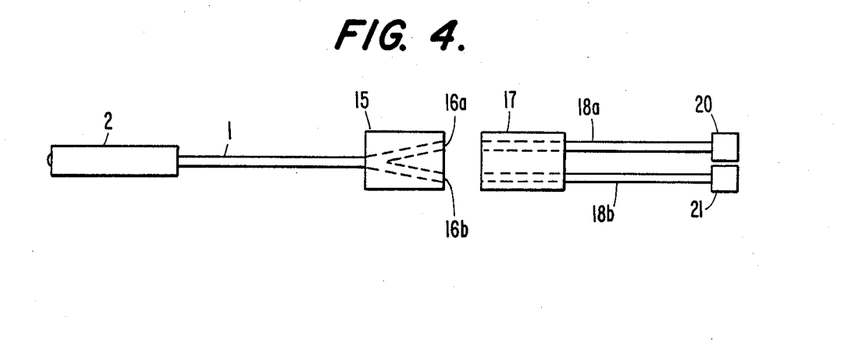
FIG. 4 shows another embodiment of the invention wherein the fiber optic elements are passed through a connector joint.

FIG. 4 illustrates an alternative embodiment of the invention wherein the fiber bundle 1 is terminated in a connector 15 which contains a pair of fiber optic bundles 16a and 16b. A mating connector 17 contains a pair of light guiding fiber optics 18a and 18b. A light source means 20 transmits light to the fiber optic guide 18a which couples to the light guide 16a. Light is reflected back into the fiber optic light guide 16b from the cantilever beam 5, coupled to the light guide 18b and transmitted to a light detector means 21.

Figure 5:
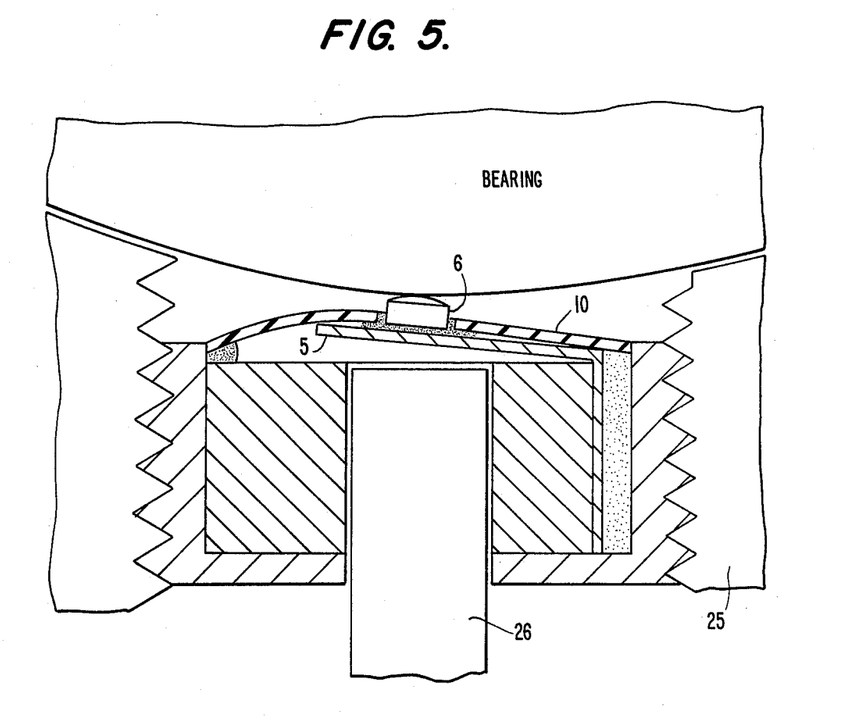
FIG. 5 shows another embodiment of the invention wherein the tip and spring elements are mounted in a bearing housing and the fiber optic light guiding elements are removable therefrom.
Figure 6:
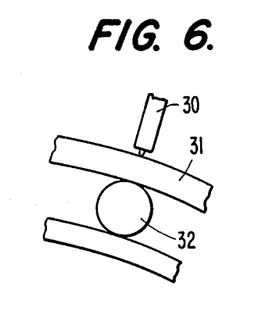
FIG. 6 is a schematic view of a contact transducer in contact with an undamaged rolling element bearing.
Figure 6A:
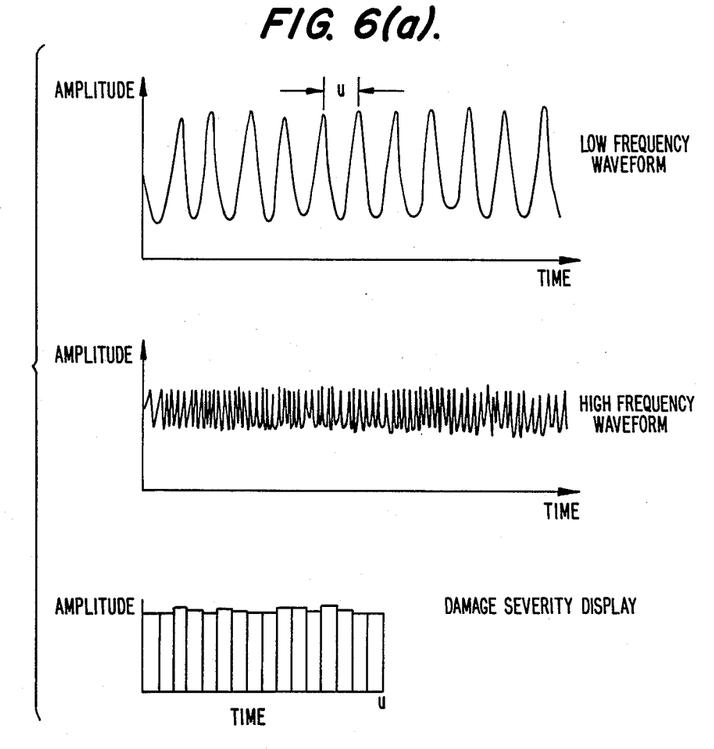
FIG. 6a is a graphic illustration of an undamaged bearing.

FIG. 5 illustrates another alternative embodiment of the invention wherein the tip 6, cantilever 5 and sealing elements 10 are mounted and fixtured to a bearing housing 25 and wherein a fiber optic light guide means 26 can be manually adjusted to set the gap between the fiber bundle 26 and the cantilever beam 5. In this configuration, the fiber optic light guide could be inserted temporarily into position for recording of measurements. When measurements are not being taken, the fiber optic light guides can be removed. In that case, a plug cap is inserted in place of the fiber optic bundle 26 to protect the reflective surface of the cantilever 5 from combination. FIG. 6 shows a contact transducer 30 with high frequency capability which is in contact with the stationary outer ring of a rolling element bearing. The rolling element 32 may be a ball or a roller of any type. A low frequency waveform is shown FIG. 6(a) which is developed by the action of rolling elements passing by the transducer. The time u is the time between successive passages of rolling elements. A high frequency waveform is shown for a typical bearing that is free of defects. A damage display is shown which is a bar graph having u units along the horizontal axis. When a bearing has no defect damage, the damage display shows all bars at approximately the same height.

Figure 7:
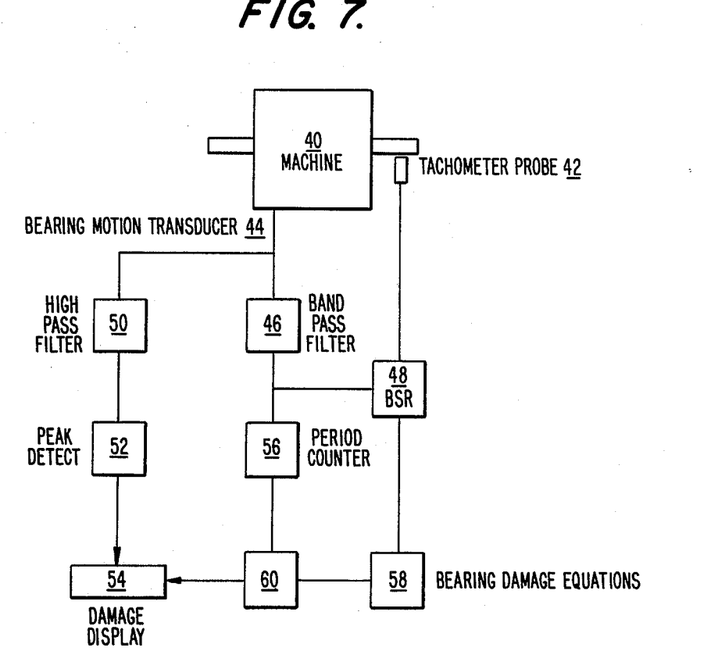
FIG. 7 is a block diagram of the circuitry used to display bearing damage.

The damage display operates in accordance with the block diagram shown in FIG. 7. A machine such as an electric motor 40 is monitored with a tachometer probe 42, to generate a signal at the shaft rotational frequency, and with a bearing motion transducer 44. The waveform from the bearing transducer is passed through a band pass filter 46 to separate out the load dependent deflection component of the bearing signal. That signal and the shaft tachometer signal are sent to a frequency ratio counter 48 to compute the bearing speed ratio (BSR) as described in U.S. Pat. No. 4,196,629. The bearing motion signal is also sent through a high pass filter 50 which eliminates the load dependent deflection data. The signal is then sent to a peak detector 52 which will detect spikes in the bearing signal that are caused by damage on the component parts of the bearing. The output of the peak detector 52 is sent to the damage display 54 which is a bar graph display in the preferred embodiment. The load dependent component of the bearing signal is sent to a period counter 56 which measures the time between successive roller passages. The BSR, which is the output from the frequency ratio counter 48, is sent to a processor 58 which puts the BSR value into component damage equations for computation of proper trigger signals. The multiplier/divider 60 modifies the period of the bearing load dependent deflection in accordance with values determined by the damage equations. The trigger signal for the damage display will thereby be perfectly synchronized to the frequency of operation of the bearing component parts.

The processor 58 can also be a human interface whereby the BSR is read and then used to calculate the bearing damage frequencies O for outer ring damage, I for inner ring damage, R for roller damage, and C for cage damage in accordance with the formulas $O = RPM \times BSR$, $I = RPM \times (n - BSR)$, $R = RPM \times BSR((OD + ID)/d + 2)/n$, and $C = RPM \times BSR/n$ where RPM is the inner ring rotational speed, n is the number of rolling elements, OD is the outer diameter of the bearing, ID is the inner diameter of the bearing, and d is the diameter of the rolling element.

Figure 8:
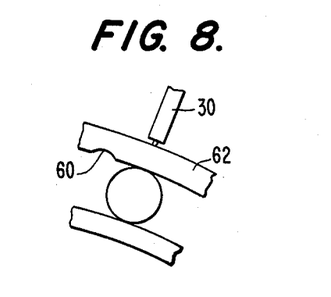
FIGS. 8-13 are views similar to FIG. 6 illustrating various amounts of bearing damage.
Figure 8A:
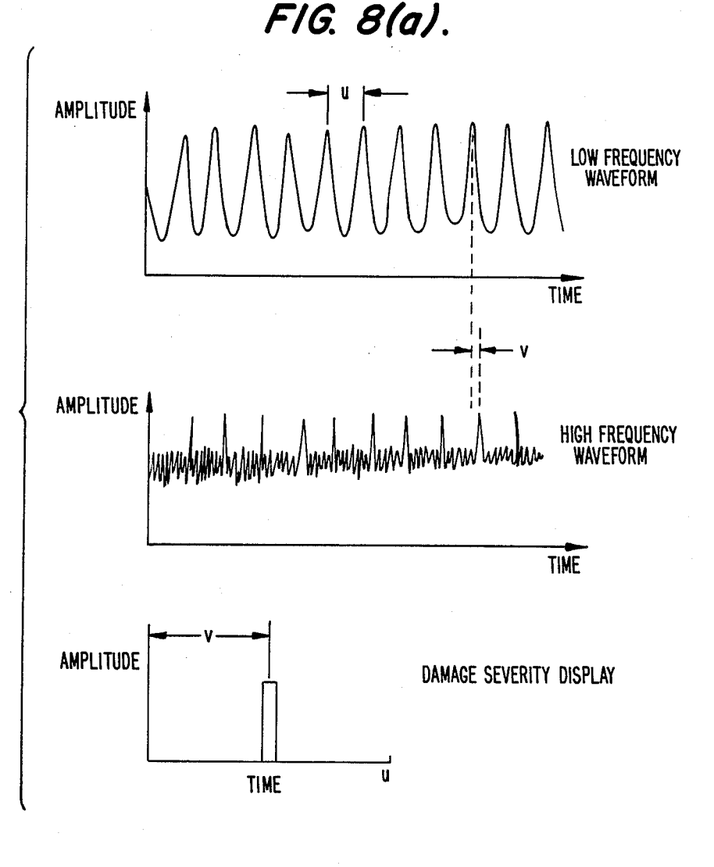
Figure 9:
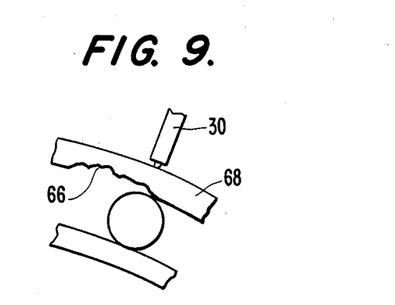
Figure 9A:
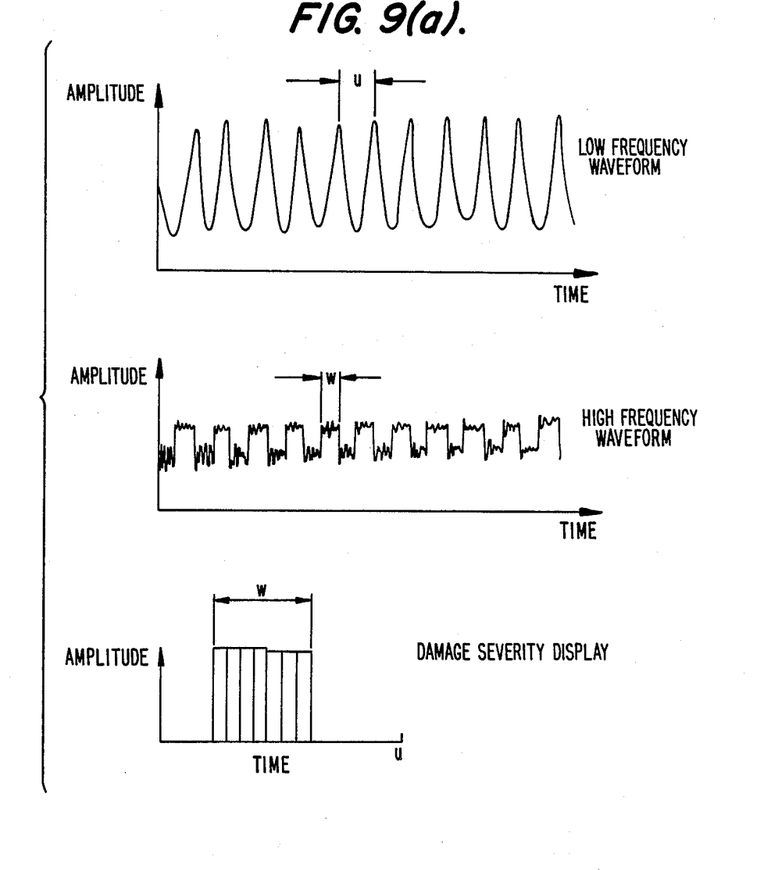

A small amount of damage 60 on a bearing outer ring 62 will result in the waveforms and display shown in FIG. 8(a) where the display time is set to be u which is equal to 1/0. The value of v in FIG. 8(a) will depend upon the location of the transducer 64 with respect to the defect 60. A large damage 66 on a bearing outer ring 68 in FIG. 9 results in the waveform and display shown in FIG. 9(a). The greater length of damage along the outer ring in the direction of rolling causes impacts to occur over a longer time duration w. The size of the damage is determined from the ratio w/u where the quantity u is proportional to the length between two rolling elements along the circumference of the outer raceway.

Figure 10:
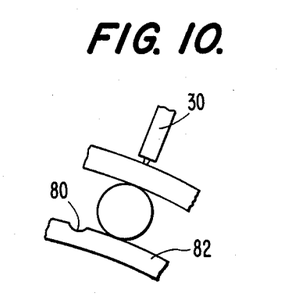
Figure 10A:
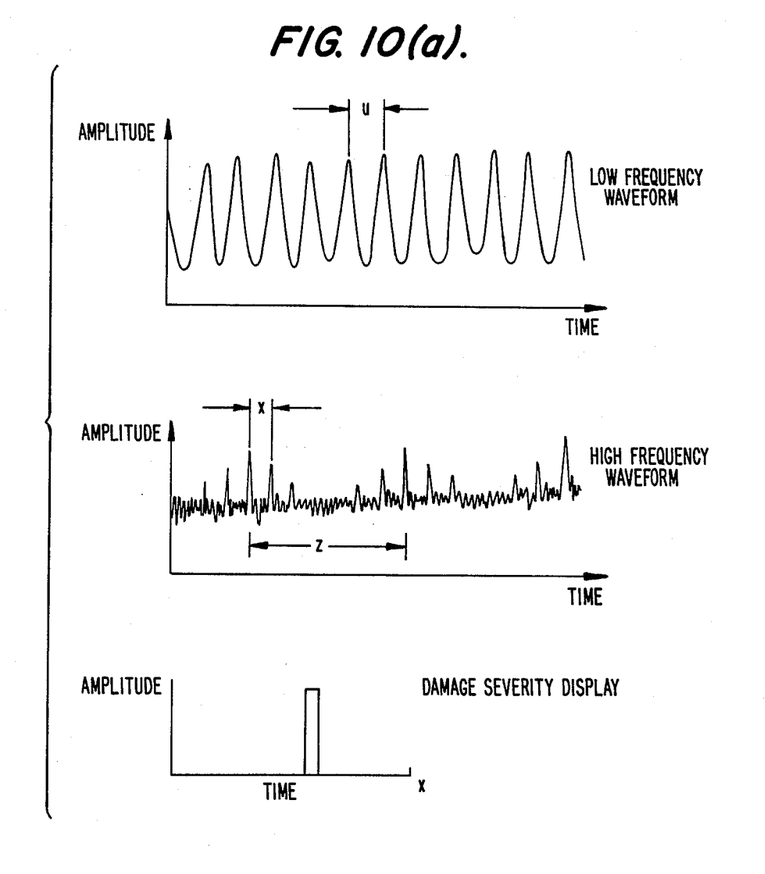

A small amount of damage 80 on a bearing inner ring 82 in FIG. 10 results in the waveform and damage display shown in FIG. 10(a) where the display time x is set to be 1/I. The time 1/I is proportional to the length between two adjacent rollers along the length of the inner ring.

Figure 11:
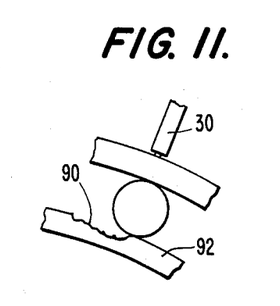
Figure 11A:
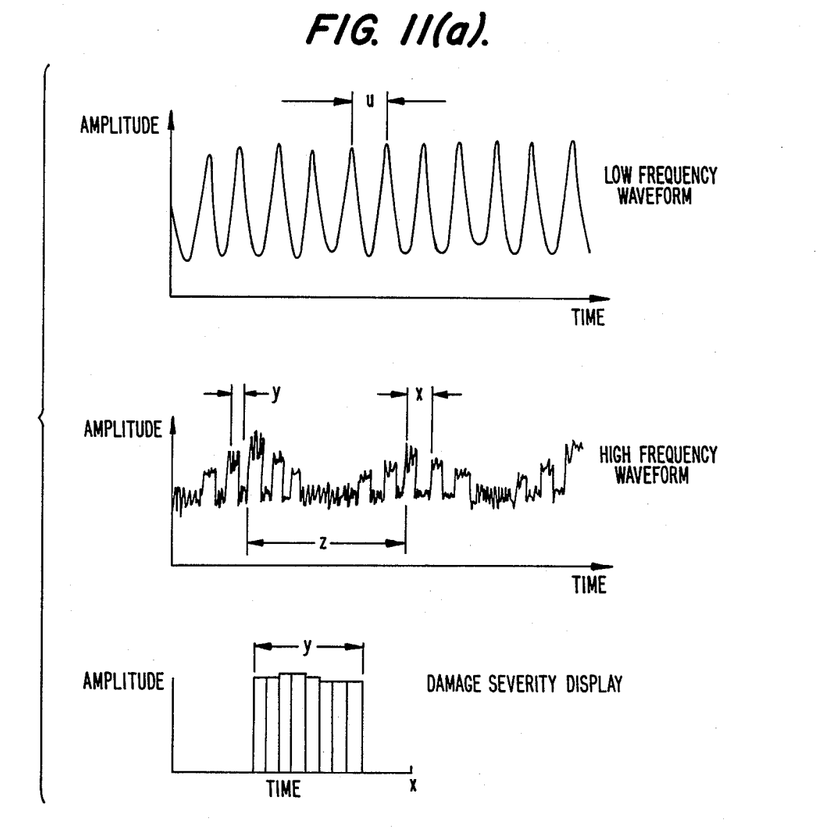

A large amount of damage 90 on the inner ring 92 in FIG. 11 results in the waveform and damage display shown in FIG. 11(a). A measure of the length of the damage is found by computing the ratio y/x. When this ratio equals 1.0, the length of the defect is equal to the length between rolling elements. It is seen from FIGS.

10(a) and 11(a) that the amplitude of the spikes in the high frequency waveform modulates with an interval of time z. That interval z is equal to the period of one shaft revolution. When the ratio y/x approaches 1.0, the damage display should be changed to be synchronized with z. In this manner, the display will indicate the size of the damage as a fraction of the circumference of the inner ring.

Figure 12:
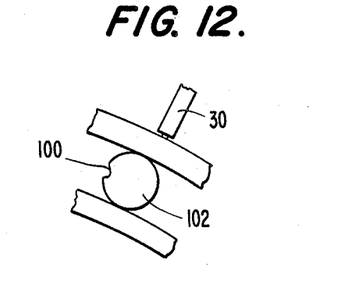
Figure 12A:
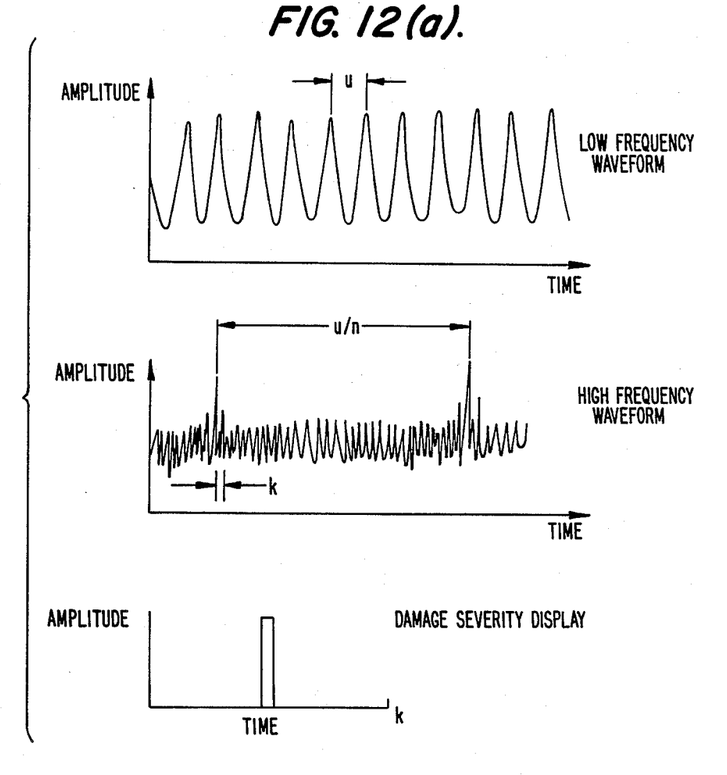

A small amount of damage 100 on a rolling element 102 in FIG. 12 will result in the waveforms shown in FIG. 12(a) where the display time is set to be a which is equal to 1/R. As the damage on a roller grows, the width of the bar graph will grow proportionately and the size of the damge can be read as a fraction of the roller semi-diameter.

Figure 13:
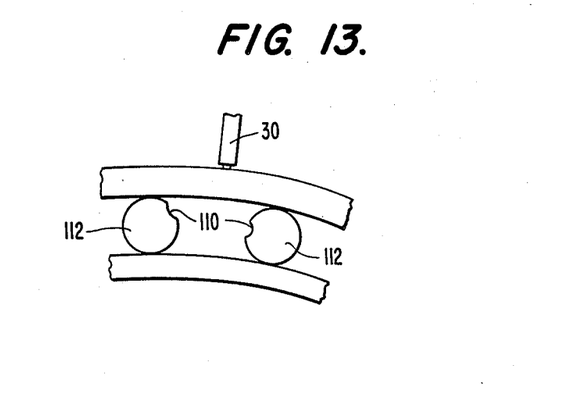
Figure 13A:
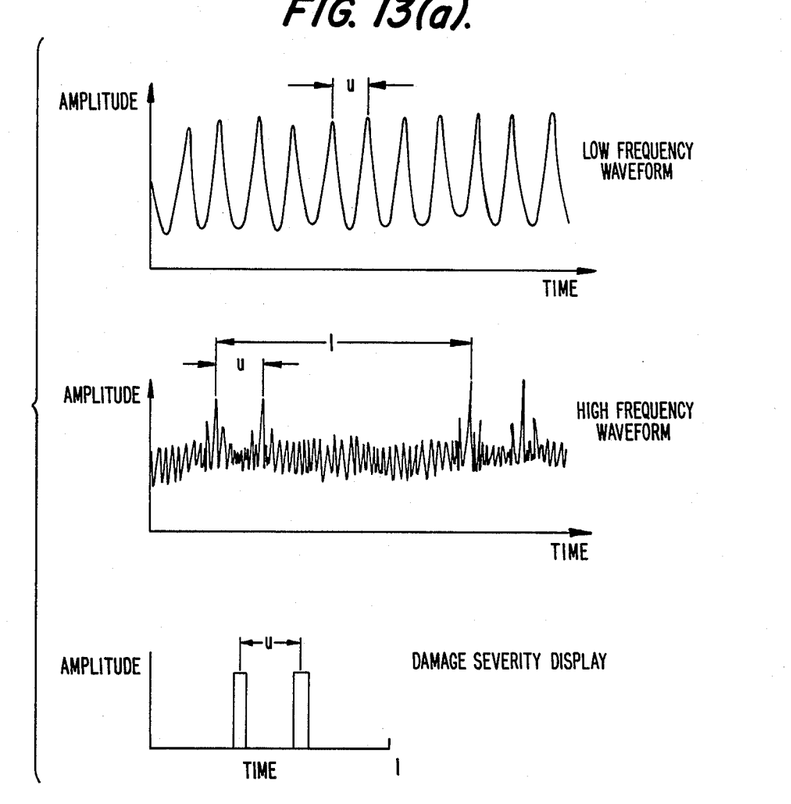

FIG. 13 shows more than one rolling element 112 with a defect 110. The high frequency waveform and damage display will appear as shown in FIG. 13(a) where the display time is set to be b which is equal to 1/C. In this mode, a bar will appear for each rolling element that is damaged.

In summary, the invention achieves a high frequency capability to make displacement measurements with a contacting device by properly focusing non-contacting fiber optic sensing means at a reflective cantilever spring that biases a ruby tip against an object whose motion is to be measured. By proper design, the masses of the moving elements are minimized and the spring stiffness of the cantilever adjusted for maximum frequency response at safe contact stress levels. In so doing, the advantages of fiber optic displacement sensors namely high frequency response, small size and immunity from electrical and electromagnetic noises are combined with the non-fouling properties of contacting sensors.

It will be understood that variations and modifications may be effected without department from the spirit and scope of the novel concepts of this invention. Namely, the material of the cantilever which is stainless steel in the preferred embodiment could likely be berrylium copper for its good endurance strength, or titanium for its high Young's Modulus, or some composite material to which a reflective coating may or may not be applied. It is also suggested that contact tips of various shapes, materials, or configurations can be designed to enhance the reliability, performance, or ease of manufacture of the invention. For example, the tip may be mechanically affixed to the spring beam or the beam itself may be curved or dimpled to form its own contact tip. It is furher suggested that dynamic motion of the cantilever beam may be sensed by means other than light sensing means; for example, eddy current or capacitance sesing means may be used.

What is claimed is:

1. A transducer system with high frequency capability in the range up to 10,000 Hz for the detection and measurement of impact activity of rolling elements bearings and the like, comprising:
   (a) means for reflecting incident light and for vibrating in unison with a contacted object having a dynamic motion;
   (b) means for guiding transmitted light to and for guiding received reflected light from the reflecting light means;
   (c) means for contacting the bearing and for supporting the light reflecting means;
   (d) means for biasing the contacting means to precisely follow the dynamic motion of the bearing object; and
   (e) means capable of operating up to 10,000 Hz for determining the nature of a bearing defect from the impact activity.

2. A system according to claim 1, including:
   (a) a light source associated with the light guiding means for transmitting light to the light reflecting means; and
   (b) means for generating a signal from light received from the light guiding means.

3. A system according to claim 1, wherein:
   the means for guiding light to and from the light reflecting means comprise a plurality of light conducting fiber optics, said fiber optics being divided into a plurality of groups, at least one group comprising light transmitting fiber optics and at least another group comprising light receiving fiber optics, the fiber optics of both groups merging to form a substantially unitary peripheral surface which is truncated to form a substantially planar surface.

4. A system according to claim 1, wherein:
   the light reflecting means is substantially flat and substantially reflective and being an undersurface of a cantilever spring.

5. A system according to claim 1, wherein:
   the light relfecting means is electropolished stainless steel.

6. A system according to claim 1, wherein:
   the contacting means has an outer peripheral surface which is substantially arcuate in shape.

7. A system according to claim 1, wherein:
   the contacting means is of a ruby material.

8. A system according to claim 1, wherein:
   the contacting means is rigid and a substantially cylindrical member with one flat end and one crowned end.

9. A system according to claim 8 wherein:
   the contacting means has a diameter of about 1 mm. and a crown radius of about 2.5 mm.

10. A system according to claim 1, wherein:
    the biasing means is a cantilever spring having a spring rate of at least 200 lb./in.

11. A system according to claim 1, wherein:
    the biasing means is a cantilever spring having a maximum deflection of 0.008 inch and a maximum contact pressure of 250,000 psi.

12. A system according to claim 4, including sealing means, the sealing means being fixidly attached to the cantilever spring whereby movement of the light reflecting means is unaffected by contact with said sealing means.

13. A system according to claim 1, including means for sealing the light guiding means and light reflecting means from outside sources of contamination.

14. A system according to claim 2, wherein:
    the generating means converts changes of reflective light intensity into target motion signals.

15. A system according to claim 1 wherein said determining means includes:
    (a) means for generating a signal at a shaft rotational frequency,
    (b) means for generating a signal from said light reflecting means,
    (c) means for computing the bearing speed ratio from said signals, and (d) means for displaying the impact activity in accordance with;
  (1) a low frequency waveform developed by the action of the rolling elements passing the contacting means,
  (2) a high frequency waveform also developed by the action of the rolling elements passing by the contacting means, and
  (3) a time equal to the rate of bearing operation.

16. The system of claim 15 wherein the rolling element bearing includes a stationary ring and wherein the time is between successive passes of the rolling elements on the stationary ring.

17. The system of claim 15 wherein the rolling element bearing includes a rotating ring and wherein the time is equal to the period of rotation of the rotating ring.

18. The system of claim 15 wherein the rolling element bearing includes a cage and wherein the time is equal to the period of rotation of the cage of the rolling elements.

19. The system of claim 15 wherein the time is equal to the period of rotation of the rolling elements abut their own axis.

20. The system of claim 15 wherein the rolling element bearing includes a rotating ring and wherein the time is equal to the time between successive passes of the rolling elements passing a point on the rotating ring.

21. A method of determining impact activity of a rolling element bearing or the like comprising:
  (a) generating signals in accordance with the relative motion between a bearing and a bearing housing,
  (b) displaying the impact activity from said signals in accordance with;
    (1) a low frequency waveform developed by the action of the rolling elements,
    (2) a high frequency waveform developed by the action of the rolling elements, and
    (3) a time equal to the rate of bearing operation.

22. The method of claim 21 including generating a signal at a shaft rotational frequency and computing the bearing speed ratio from said signals.

23. The method of claim 21 wherein the impact activity is damage on a stationary ring of the bearing and wherein the time is the time between successive passes of the rolling elements on the stationary ring.

24. The method of claim 21 wherein the impact activity is damage to a rotating ring of the bearing and wherein the time is equal to the period of rotation of the rotating ring.

25. The method of claim 21 wherein the impact activity is damage to a rolling element and the time is equal to the period of rotation of the rolling element.

26. The method of claim 21 wherein the impact activity is damage to a rotating ring and the time is equal to the time between successive passes of rolling elements passing a point on the rotating ring.

27. The method of claim 21 wherein the impact activity is damage to a rolling element and the time is equal to the period of rotation of a cage.

28. The method of claim 21 wherein the impact activity is damage to a cage and the time is equal to the period of rotation of rotation of the cage.

29. The method of claim 21 wherein the impact activity is contamination of the bearing and the impact activity is randomly generated.

30. The method of claim 21 wherein the time duration of the impact activity is equal to the size of the damage along the length of the damaged component.

* * * * *